United States Patent
Zhang et al.

(10) Patent No.: US 10,049,213 B2
(45) Date of Patent: Aug. 14, 2018

(54) FOG-BASED DISTRIBUTED MALWARE DEFENSE

(71) Applicant: Cisco Technology, Inc., San Jose, CA (US)

(72) Inventors: Tao Zhang, Fort Lee, NJ (US); Yi Zheng, San Jose, CA (US); Helder F. Antunes, Morgan Hill, CA (US); Danyang Raymond Zheng, Fremont, CA (US); Jack C. Cham, San Leandro, CA (US); Gonzalo Salgueiro, Raleigh, NC (US); Joseph Michael Clarke, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 140 days.

(21) Appl. No.: 15/130,155

(22) Filed: Apr. 15, 2016

(65) Prior Publication Data
US 2017/0300693 A1    Oct. 19, 2017

(51) Int. Cl.
*H04L 29/06* (2006.01)
*G06F 21/56* (2013.01)
*H04L 29/08* (2006.01)

(52) U.S. Cl.
CPC ............ *G06F 21/566* (2013.01); *H04L 67/06* (2013.01); *H04L 67/125* (2013.01)

(58) Field of Classification Search
CPC ..... H04L 67/104; H04L 67/06; H04L 67/125; H04L 67/0816; H04L 63/14; H04L 63/1408; H04L 63/1416; H04L 63/1433; G06F 21/56; G06F 21/566; G06F 21/562; G06F 21/564

USPC .......................................................... 726/23
See application file for complete search history.

(56) References Cited

U.S. PATENT DOCUMENTS

| | | | |
|---|---|---|---|
| 8,341,745 B1 | 12/2012 | Chau et al. | |
| 9,332,029 B1* | 5/2016 | Tikhonov | H04L 63/145 |
| 2008/0101234 A1* | 5/2008 | Nakil | H04L 63/1425 370/235 |
| 2009/0044024 A1* | 2/2009 | Oberheide | G06F 21/562 713/188 |

OTHER PUBLICATIONS

Stojmenovic et al. "The Fog Computing Paradigm: Scenarios and Security Issues" Computer Science and Information Systems; ACSIS, vol. 2; 2014; pp. 1-8.
(Continued)

*Primary Examiner* — Yogesh Paliwal
(74) *Attorney, Agent, or Firm* — Parker Ibrahim & Berg LLP; James M. Behmke; Stephen D. LeBarron

(57) ABSTRACT

In one embodiment, a device in a network joins a fog-based malware defense cluster comprising one or more peer devices. The device and each peer device in the cluster are configured to execute a different set of local malware scanners. The device receives a file flagged as suspicious by a node in the network associated with the device. The device determines whether the local malware scanners of the device are able to scan the file. The device sends an assessment request to one or more of the peer devices in the malware defense cluster, in response to determining that the local malware scanners of the device are unable to scan the file.

20 Claims, 14 Drawing Sheets

(56) References Cited

OTHER PUBLICATIONS

McAfee—An Intel Company—McAfee Advanced Threat Defense 3.2.0; Product Guide; 2014; pp. 323.
Fog Computing Provide Security to the Data in Cloud; Jan. 22, 2016; pp. 1-21.
Lee et al. "On Security and Privacy Issues of Fog Computing supported Internet of Things Environment" pp. 1-3.
Newman "The Internet of Things Needs Anti-Virus Protection" Red Balloon Symbiote anti-virus security software protects embedded devices; Mar. 10, 2014; pp. 1-4.
"AESOP: Ubiquitous Embedded Security in the Post-Post-PC Threat Environment" Red Balloon Security 2014; pp. 1-14.
"Intel Gateway Solutions for the Internet of Things" Product Brief; pp. 1-4.
Kaur et al. "International Journal of Advance Research in Computer Science and Management Studies" vol. 2, Issue 10, Oct. 2014; pp. 1-7.
"The Internet of Things: Reduce Security Risks with Automated Policies" Cisco; 2015; pp. 1-6.
"Cisco Cloud Connectors: Bringing Network Intelligence to the Cloud" Cisco; pp. 1-10.

\* cited by examiner

US 10,049,213 B2

FOG-BASED DISTRIBUTED MALWARE DEFENSE

TECHNICAL FIELD

The present disclosure relates generally to computer networks, and, more particularly, to a fog-based, distributed malware defense mechanism.

BACKGROUND

Low-Power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability of a device, etc. Changing environmental conditions may also affect device communications. For example, physical obstructions (e.g., changes in the foliage density of nearby trees, the opening and closing of doors, etc.), changes in interference (e.g., from other wireless networks or devices), propagation characteristics of the media (e.g., temperature or humidity changes, etc.), and the like, also present unique challenges to LLNs. For example, an LLN may be an Internet of Things (IoT) network in which "things," e.g., uniquely identifiable objects such as sensors and actuators, are interconnected over a computer network. Typically, IoT networks include a very large number of heterogeneous endpoints that exhibit various degrees of constrained resources.

Malware defense generally entails detecting and preventing system changes, such as the installation of software and other configuration settings, that are intended for malicious purposes (e.g., disrupting operation of the device or network, data exfiltration, etc.). Doing so is fairly straightforward in traditional networks, as the devices have a high degree of local resources, network links are fairly stable, etc. For example, an endpoint computer may execute its own virus scanner, to detect and prevent the installation of viruses on the local device. These same host-based approaches, however, are not applicable in many IoT implementations where the endpoint nodes have very limited resources.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
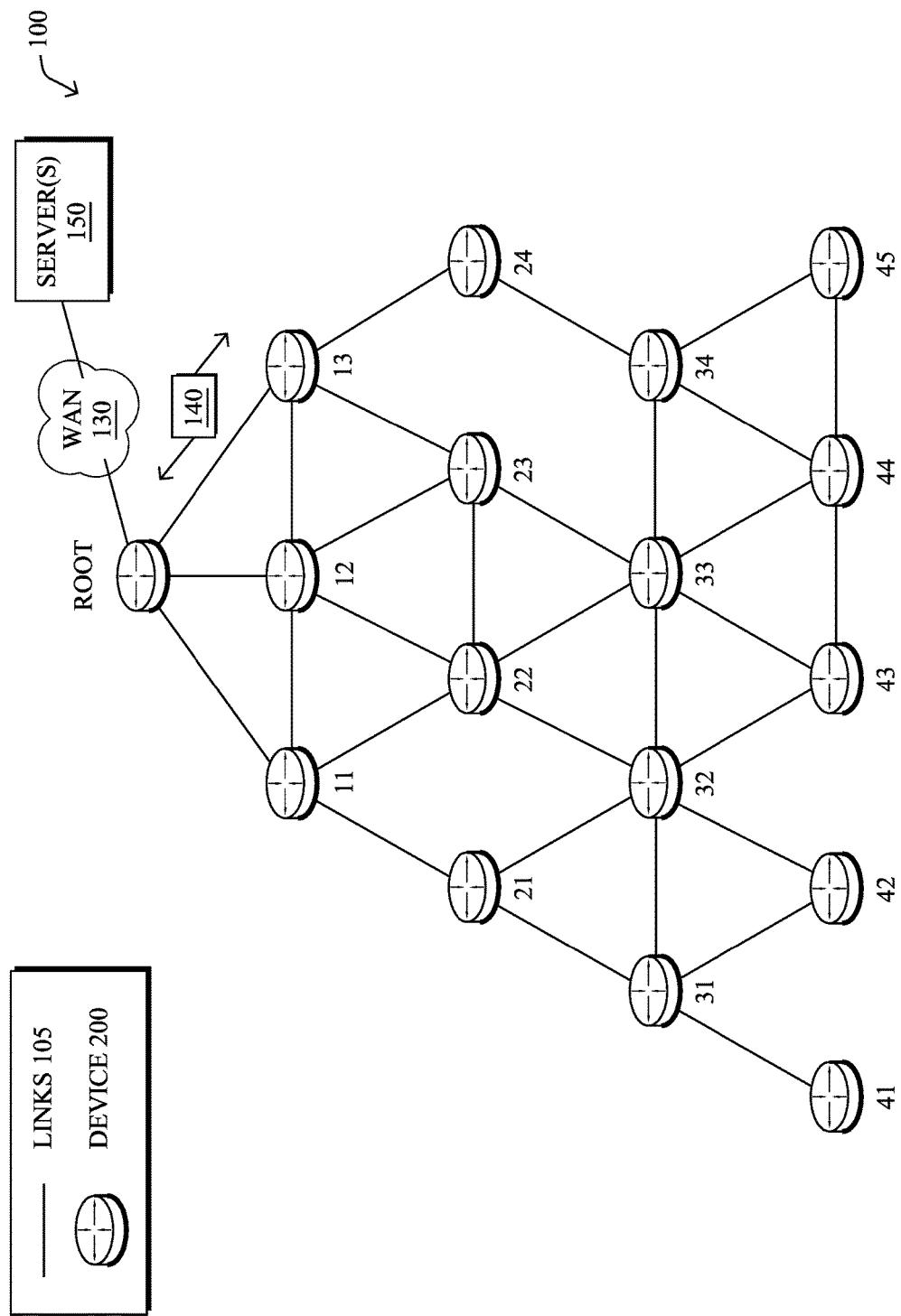
FIG. 1 illustrates an example communication network.

According to one or more embodiments of the disclosure, a device in a network joins a fog-based malware defense cluster comprising one or more peer devices. The device and each peer device in the cluster are configured to execute a different set of local malware scanners. The device receives a file flagged as suspicious by a node in the network associated with the device. The device determines whether the local malware scanners of the device are able to scan the file. The device sends an assessment request to one or more of the peer devices in the malware defense cluster, in response to determining that the local malware scanners of the device are unable to scan the file.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 200 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Nodes 200 may communicate with any number of external devices, such as server(s) 150 via a network 130, which may be a WAN in some implementations. For example, a particular node 42 may send sensor data to server 150 for further processing, either via a local network or via a WAN. Server(s) 150 may include, but are not limited to, network management system (NMS) devices, supervisory control and data acquisition (SCADA) devices, enterprise resource planning (ERP) servers, other network administration devices, servers that provide cloud-based services, or the like.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.) or other shared-media protocols where appropriate. In this context, a protocol consists of a set of rules defining how the nodes interact with each other.

Figure 2:
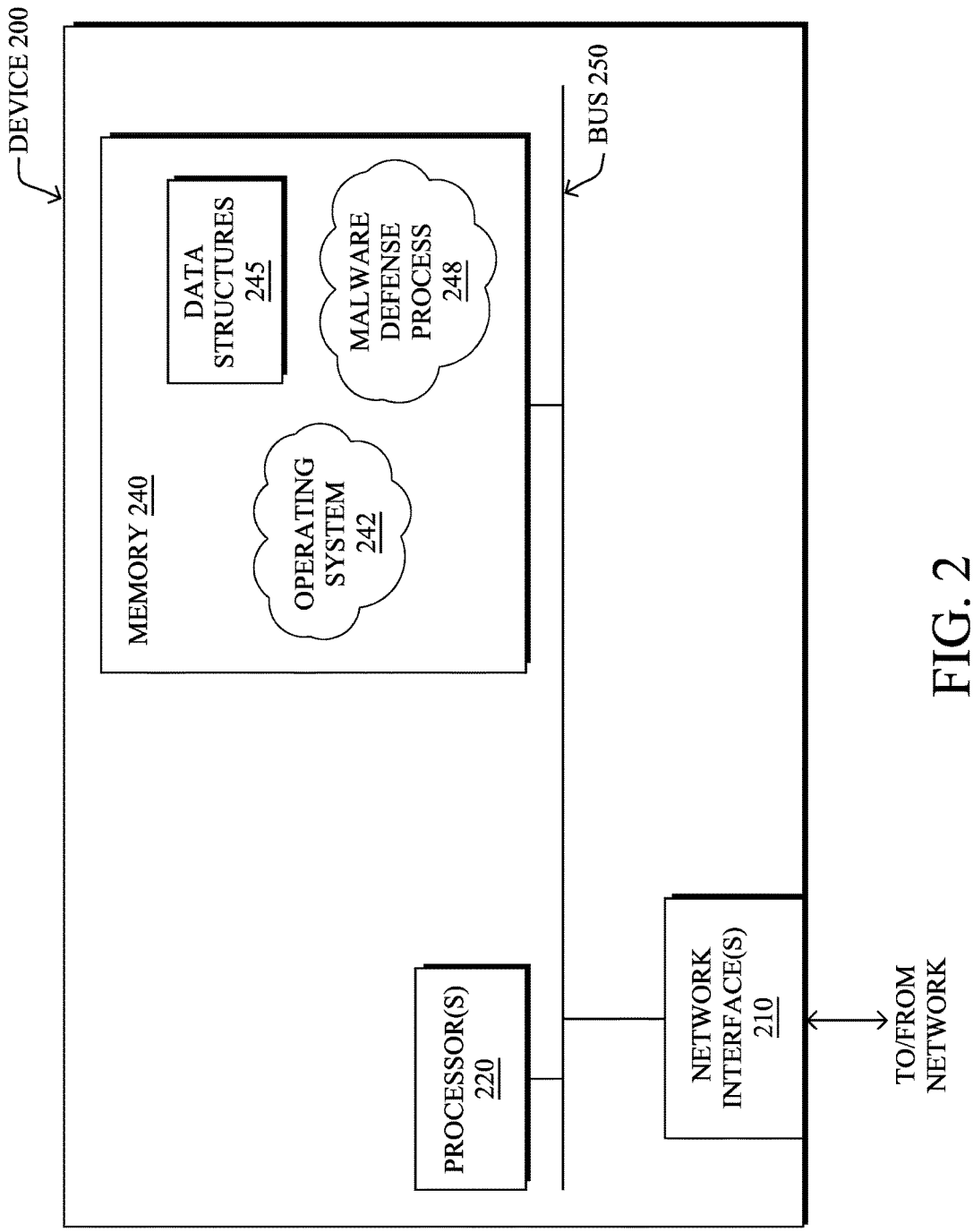
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, etc.), at least one processor 220, and a memory 240 interconnected by a system bus 250, and powered by one or more power sources (e.g., a local charge storage mechanism, a power line, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise a malware defense process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Mesh networks have become increasingly popular and practical in recent years. In particular, shared-media mesh networks, such as wireless networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways.

As noted above, malware defense in LLNs, such as IoT networks, presents various challenges. Notably, in contrast to traditional computer networks, the available resources of endpoint LLN nodes are often constrained to the point that host-based malware detection is not possible. For example, consider the case in which an endpoint node is a low-power sensor that turns itself on periodically to take and report a sensor reading, before powering itself back down to conserve battery power. In such a case, the sensor may not have sufficient processing power to support a processing-intensive, host-based malware detector, such as a signature-based scanner. Additionally, as LLNs can include thousands of heterogeneous endpoint nodes, management and deployment of host-based detectors would be unwieldy, even if the endpoints had sufficient resources to execute the required malware scanners.

Cloud-based security services offer another possible way to protect against malware. For example, a device in a local network could send a file for inspection to the cloud via the Internet. While this approach may work for some implementations, cloud-based security for LLNs also creates several potential avenues for attack. For example, since cloud-based security depends on an external communication link between the local network and the cloud system, disruption of the link (e.g., using a denial of service attack, etc.) could make the local network vulnerable to malware while the link is down.

In addition to host-based and cloud-based solutions, some traditional malware defense systems use devoted intrusion detection and prevention devices, such as network-based firewalls. Generally, these approaches attempt to detect and block suspicious files from ever entering a local system and are used in combination with host-based solutions. However, firewalls and other dedicated devices that operate at the perimeter of a network are also unable to detect other malware distribution routes that do not traverse the edge of the network. For example, while a firewall or other intrusion prevention device may block malware in an incoming email, these mechanisms are also not able to block malware that is not in their paths (e.g., files installed from a local media such as a USB drive, peer-to-peer or machine-to-machine malware distributions within the local network, etc.).

Fog-Based Distributed Malware Defense

The techniques herein present a set of new methods to use fog-based distributed and local malware defense, to help protect endpoints in a network from malware attacks. In some aspects, the techniques herein provide for distributed fog devices to collaborate in a malware defense cluster, without requiring endpoint nodes to implement complex and resource-intensive malware monitoring and protection mechanisms. In some cases, endpoint nodes may execute only a thin agent that detects and flags suspicious files (e.g., newly installed files from local media, file updates, etc.), before sending the suspicious files to a designated local fog node in the cluster for actual scanning. In another aspect, each fog device in the malware defense cluster may execute different sets of malware scanners, to account for the numerous device types and configurations in the network, and coordinate with the other peer devices in the cluster to perform malware scanning.

Specifically, according to one or more embodiments of the disclosure as described in detail below, a device in a network joins a fog-based malware defense cluster comprising one or more peer devices. The device and each peer device in the cluster are configured to execute a different set of local malware scanners. The device receives a file flagged as suspicious by a node in the network associated with the device. The device determines whether the local malware scanners of the device are able to scan the file. The device sends an assessment request to one or more of the peer devices in the malware defense cluster, in response to determining that the local malware scanners of the device are unable to scan the file.

Illustratively, the techniques described herein may be performed by hardware, software, and/or firmware, such as in accordance with the malware defense process 248, which may contain computer executable instructions executed by the processor 220 (or independent processor of interfaces 210) to perform functions relating to the techniques described herein.

Figure 3:
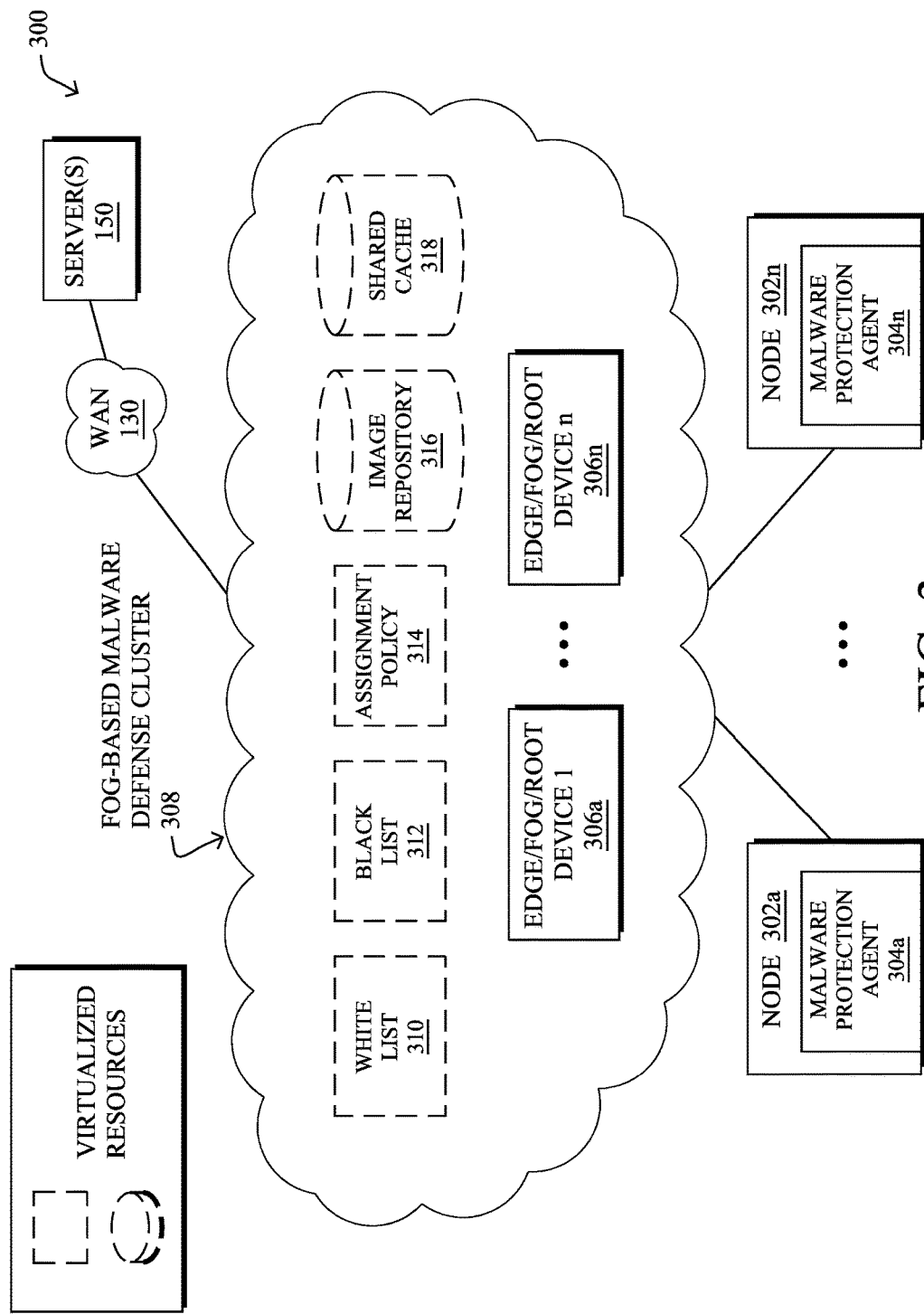
FIG. 3 illustrates an example fog-based malware detection architecture.

Operationally, FIG. 3 illustrates an example, fog-based malware detection architecture 300, according to various embodiments. As shown, architecture 300 may include any number of endpoint nodes 302a-302n (e.g., a first through nth device/node). For example, endpoint nodes 302a-302n may include any number of different sensors, actuators, or other computing devices with disparate capabilities and configurations. Each of endpoint nodes 302a-302n may be attached to an edge/fog/root device 306a-306n (e.g., a first through nth edge device) (hereinafter "edge device"). In some cases, such as illustrated in FIG. 1, each endpoint nodes 302 may be attached to a particular edge device 306, either directly (e.g., single hop) or indirectly (e.g., via multiple hops across other nodes 302), thereby forming local networks headed by the edge device 306. In turn, the edge devices 306 may communicate with one another across and/or with remote server(s) 150 via WAN 130 and/or a backbone network connecting edge devices 306a-306n. Typically, device 306 may have greater capabilities than the deployed nodes 302. For example, edge device 306a may be a field area router or other network border router, while node 302a may be a deployed sensor with extremely limited processing capabilities.

In various embodiments, multiple fog nodes and fog systems in architecture 300 may collaborate dynamically as part of a virtual malware defense cluster 308, to protect the endpoint nodes 302 from malware attacks. Generally, fog computing entails using the devices at the network edge, to provide application services to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. For example, one set of devices 306 may be located in a first manufacturing plant as part of a first fog system, another set of devices 306 may be located in a second manufacturing plant as part of a second fog system, etc. As shown, the various fog systems of edge devices 306 may be configured to participate in fog-based malware defense cluster 308.

Fog nodes and fog systems can have the same or complementary malware defense capabilities, in various implementations. That is, each individual fog node/device does not have to implement the entire spectrum of malware defense capabilities. Instead, the malware defense capabilities may be distributed across multiple fog nodes and systems, which may collaborate to help each other to defend against malware. In other words, a fog system can include any number of virtualized services and/or data stores that are spread across the distributed fog nodes, to implement the service(s). This may include a master-slave configuration, publish-subscribe configuration, or peer-to-peer configuration. This distributed malware defense improves overall security by making it more difficult for attackers to disrupt fog system security operations.

More specifically, as shown in FIG. 3, edge devices 306 in malware defense cluster 308 may share a set of virtualized resources, to provide malware defense for nodes 302. These resources may include any or all of the resources 310-318 shown and/or other configurable resources. Resources 310-318 may also be distributed across edge devices 306 in any number of different ways, such as based on the available capabilities of the individual edge devices.

Generally, white list 310 may collectively indicate the files that are trusted for use and distribution among nodes 302 (e.g., files that do not include malware). White list 310 may include the actual trusted files or, alternatively, hashes of the trusted files. During use in malware defense cluster 308, white list 310 may provide an initial check for the malware scanners deployed to edge devices 306. For example, if the hash of a scanned file matches that in white list 310, the edge device 306 performing the malware assessment may determine that the file under scrutiny is trusted and does not include malware.

Black list 312 may operate in a similar manner as that of white list 310, but for files that are known and believed to include malware. For example, if a deployed malware scanner determines that a particular file is malware, the scanner may add a hash of the file to black list 312. In turn, edge devices 306 can simply compare the hash of any new files to that in black list 312, to quickly flag and prevent installation of the file previously identified as malware.

In some embodiments, malware defense cluster 308 may also use an assignment policy 314 that controls the distribution of different malware scanners across edge devices 306. Since malware often targets specific types of operating systems, files, devices, etc., each malware scanner may be associated with a different configuration. Accordingly, assignment policy 314 may control which specific edge node(s) 306 execute a given scanner. For example, when joining malware defense cluster 308, edge device 306a may be assigned a specific set of malware scanners according to assignment policy 314. In turn, device 306a may install or otherwise activate the assigned scanners to perform file scans on behalf of the endpoint nodes 302.

Each edge device 306 may support the same malware defense capabilities (e.g., for backup and load-balancing purposes) or different capabilities (e.g., for distributed workload). For example, some edge devices 306 may support signature-based malware scanning (e.g., using a distributed database of signatures, etc.), while others can support other malware detection mechanisms such as heuristic mechanisms, which tend to be more complex to implement. In another example, some edge devices 306 can support detection of malware targeted to Windows™ while others can handle malware targeted to Linux™. In another example, some edge devices 306 can maintain a more comprehensive malware signature database than others (e.g., because they have more storage and more frequent contact with the centralized cloud that is responsible for discovering zero-day malware and generating their signatures). In a further example, a signature database may be hashed and spread across multiple edge devices 306 for high availability purposes.

In one example, consider the case in which the endpoint nodes associated with edge device 306a are mostly Windows-based device with a few interspersed Linux-based devices (e.g., a majority of the nodes associated with edge device 306a are Windows-based). Conversely, assume that the opposite is true for the nodes associated with edge device 306n. In such a case, the different fog systems do not have to implement the full set of malware defense capabilities for both Windows-based and Linux-based devices. Instead, in some embodiments, edge device 306a may only execute malware scanners for Windows-based devices, while edge device 306n may only execute malware scanners for Linux-based devices. In turn, edge device 306a may redirect any requests to assess a Linux-based file to edge device 306n. Conversely, edge device 306n may forward any assessment request for Windows-based files to edge device 306a. In other words, the operating system-specific malware scanners may be distributed to edge devices 306 based on the characteristics of the majority of nodes 302 that they support, based on their own capabilities, etc.

The assignment of detection capabilities to edge devices 306 and/or the association between a particular endpoint node 302 and a particular edge device 306 may be preconfigured or dynamic, in various cases. For example, the malware defense cluster 308 may use dynamic discovery techniques, to determine the characteristics of nodes 302 and control the deployment of malware defense capabilities across edge devices 306, accordingly. Notably, one or more "discovery" devices or policy engine in malware defense cluster 308 may control how and where edge devices 306 perform malware detection on per-OS, per-platform, per-signature, etc. basis, which can greatly simplify malware categorization across the network.

Example factors that can control the assignment of malware capabilities across edge devices 306 are shown below in Table 1:

TABLE 1

| Factor | Edge Device |
|---|---|
| OS - Debian | Edge Device 1 |
| OS - Windows Embedded 8.1 | Edge Device 2 |
| Signature/DAT file version 2345.1.3 | Edge Device 2 |
| Signature/DAT file version 2345.1.2 | Edge Device 4 |
| CPU Speed > 2.0 GHz | Edge Device 1; Edge Device 3 |
| Available RAM > 2 GB | Edge Device 1; Edge Device 5 |
| Storage Capacity > 1 GB | Edge Device 1 |
| Endpoint Criticality - High | Edge Device 2 |
| Endpoint Criticality - Medium | Edge Device 1; Edge Device 3 |
| Endpoint Criticality - Low | Edge Device 4 |
| . . . | . . . |

As shown above in Table 1, the distribution of malware defense capabilities (e.g., installed malware scanners, etc.) among edge devices 306 may be based on any number of factors that take into account the characteristics of edge devices 306 and/or endpoint nodes 302.

In some cases, malware defense cluster 308 may also include an image repository 316 of "golden" images that serve as templates for the configurations of the various devices. For example, a given device may use a particular image in image repository 316 to set the device up with a particular set of software, resources, etc.

Malware defense cluster 308 may further include a cache 318 that may be shared across edge devices 306 in malware defense cluster 308. For example, edge devices 306 may use cache 318 to store files under analysis or other information to be shared across cluster 308.

In various embodiments, nodes 302 may execute local malware protection agents 304a-304n (e.g., a first through nth agent) configured to determine whether a given file is suspicious. In contrast to host-based malware scanners that may require considerable computing resources to assess the contents of a file, agents 304 may be lightweight processes that perform only a basic analysis of a file. For example, each endpoint node 302 may be assumed to start with a set of authorized files. An agent 304 may then flag any file that deviates from this set of authorized files as suspicious. For example, suspicious files may include files that have changed in size, new files that have appeared on the node, and files that are not digitally signed (e.g., if initial set of authorized files was digitally signed). Suspicious files can enter an endpoint node 302 through various channels such as local wired or wireless connections, removable memory devices, or remote sources.

In various embodiments, implementation of malware defense cloud 308 can span the full spectrum from preconfigured and static, to dynamic and virtualized. Some examples of static and preconfigured implementations include each endpoint node 302 being configured and assigned to particular edge devices 306, a specific edge device 306 acting as a repository for all of white list 310, or designating a particular edge device 306 as a master node that orchestrates the collaborative operations of the edge devices in malware defense cluster 308. Some examples of dynamic and virtualized implementations includes all devices 306 running their executions in stateless fashion, where all the devices 306 share virtualized version of resources 310-318 that are dynamically shard/segmented across physical devices.

FIGS. 4A-4F illustrate examples of fog-based malware detection cluster 308 performing malware detection, according to various embodiments. In the example shown in FIG. 4A, assume that certain endpoint nodes 302a-302b are attached/associated with edge device 306a and that nodes 302c-302e are attached/associated with edge device 306b. Now, assume that node 302a receives a new file (e.g., a file for installation, etc.). In such a case, as shown, the malware protection agent 304a of node 302a may assess the new file, to determine whether the file is suspicious. For example, if the file differs from the existing files on node 302a, node 302a may flag the file as suspicious.

In various embodiments, endpoint nodes 302 may determine whether a file is suspicious in any number of different ways. The simplest implementation is for a node to treat any new file, beyond its initial set of files, as suspicious. If the authorized files are digitally signed, then the node may also treat any non-signed files as suspicious. For example, the detection of new files can be event-triggered when a loadable module is downloaded to the node or a new file is loaded from a local media (such as a SD card). An endpoint can also periodically ask a remote verifier to verify the list of its current installed software using remote attestation mechanism to check whether unauthorized software is found in the system.

Figure 4A:
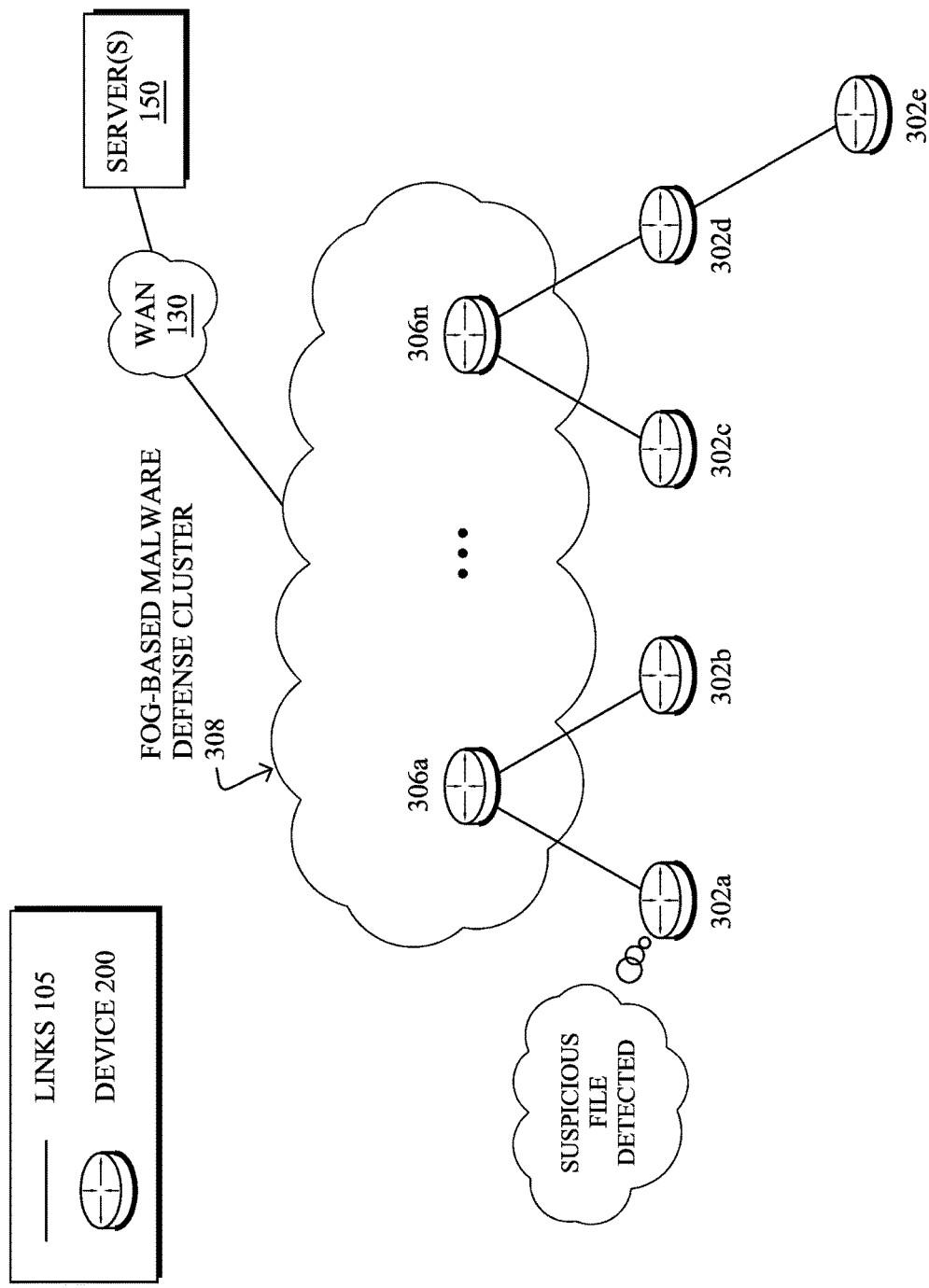
FIGS. 4A-4F illustrate examples of a fog-based malware detection cluster performing malware detection.
Figure 4B:
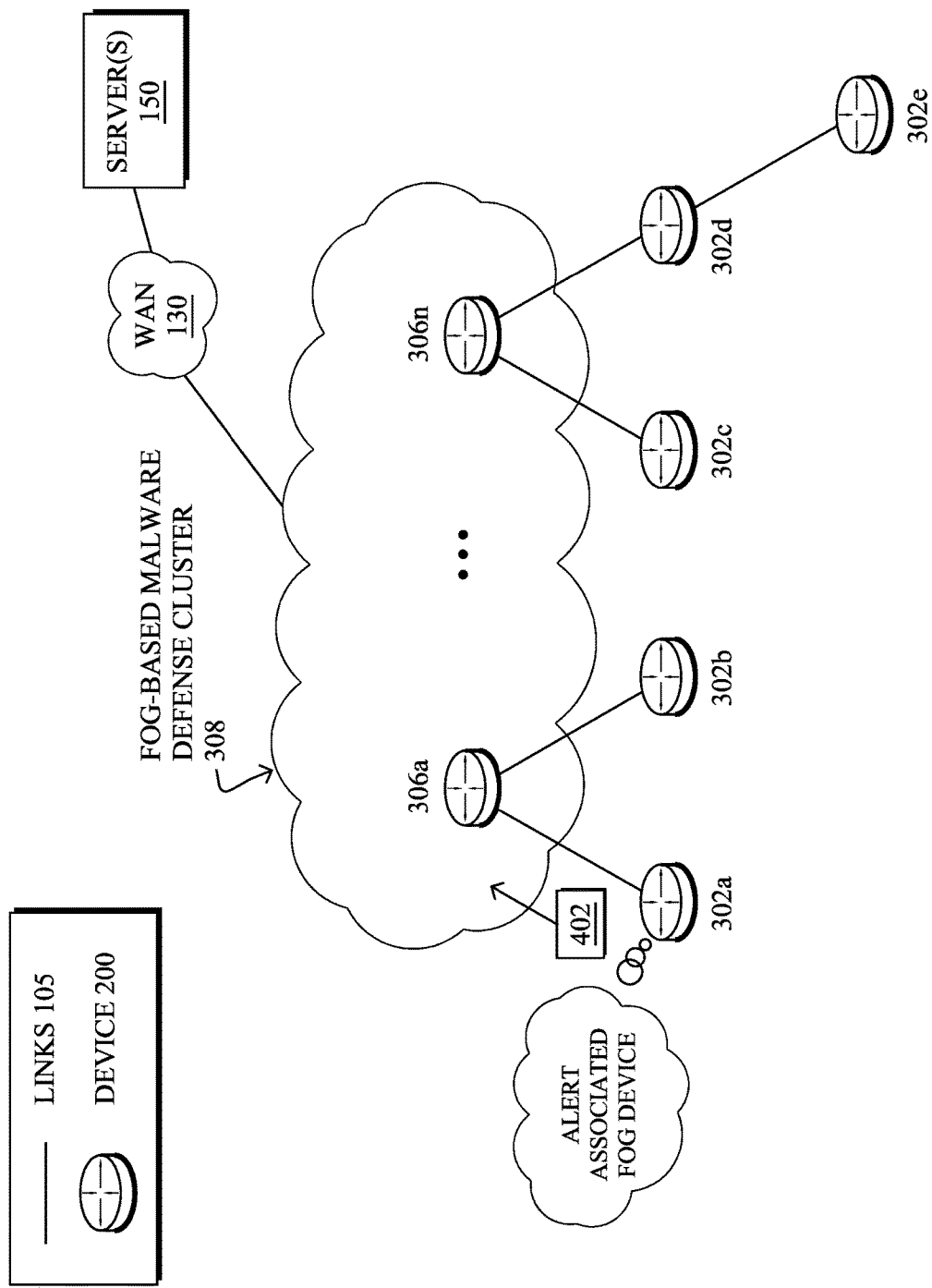

As shown in FIG. 4B, when an endpoint node 302 detects a suspicious file, it may capture the file and send it to a designated fog node for malware examination. For example, node 302a may send a notification 402 to edge device 306a, to indicate that node 302a detected a suspicious file. As would be appreciated, node 302a does not need to determine whether the file actually contains malware, only that the file is suspicious. In various embodiments, notification 402 may comprise a hash of the suspicious file or the file itself (e.g., sent using TFTP or the like), for inspection by edge device 306a.

Figure 4C:
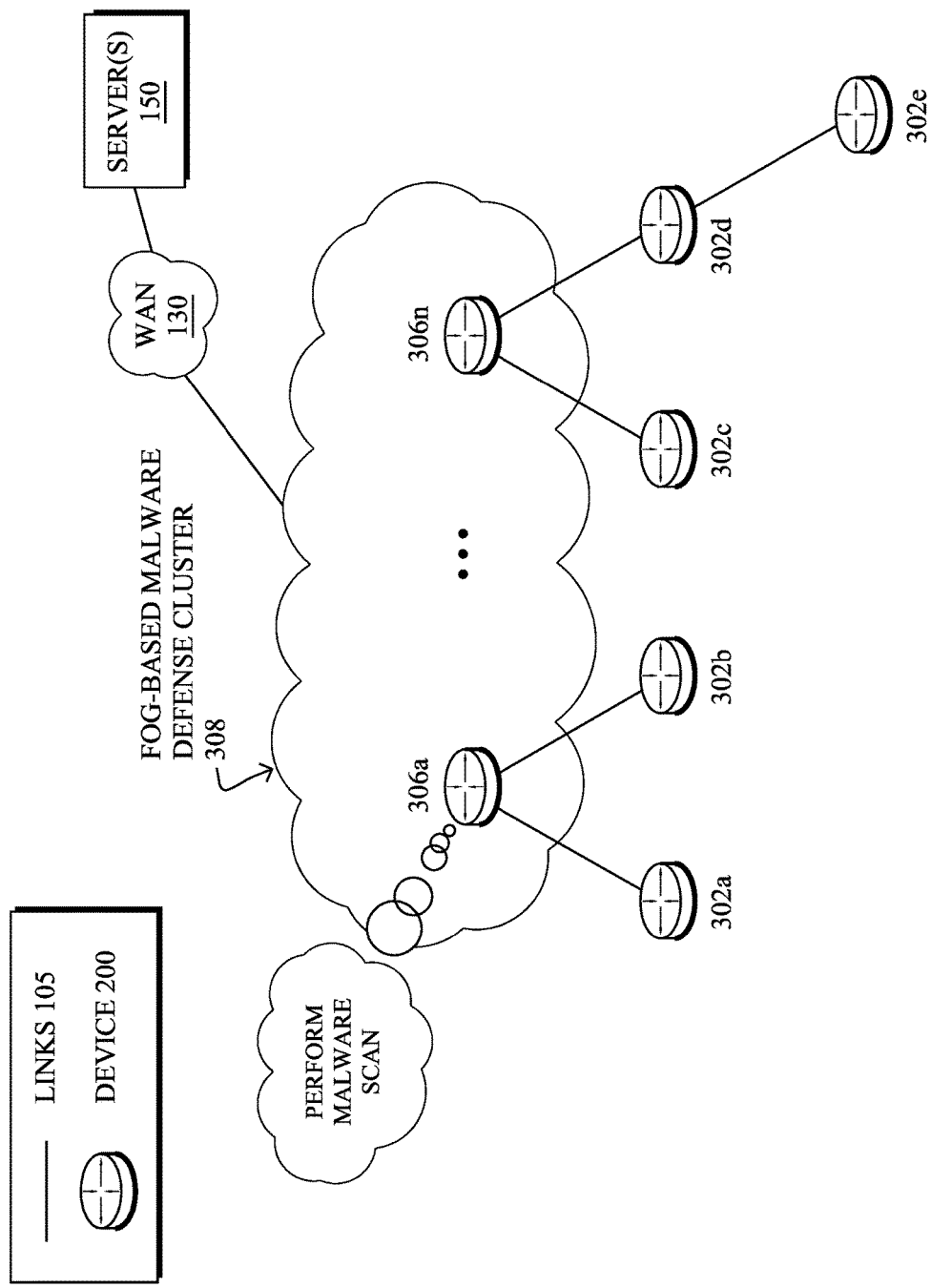

As shown in FIG. 4C, in response to receiving notification 402 (e.g., the file deemed suspicious by node 302a), edge device 306a may use its own local capabilities to determine whether the file is malware-free. For example, edge device 306a may use its local malware scanners, to scan the suspicious file. However, a number of situations may arise in which edge device 306a is unable to assess the suspicious file. For example, each edge device 306 may have a different set of malware defense capabilities (e.g., based on the characteristics of nodes 302 and/or devices 306). Another situation that may cause edge device 306a to be unable to assess the suspicious file is if edge device 306a does not have a complete or up-to-date set of required malware signatures. This situation may occur, for example, if edge device 306a has limited storage space for malware signatures or it has lost connectivity for a period of time to a cloud service that generates malware signatures. In another example, edge device 306a may have limited processing power available to scan the suspicious file.

Figure 4D:
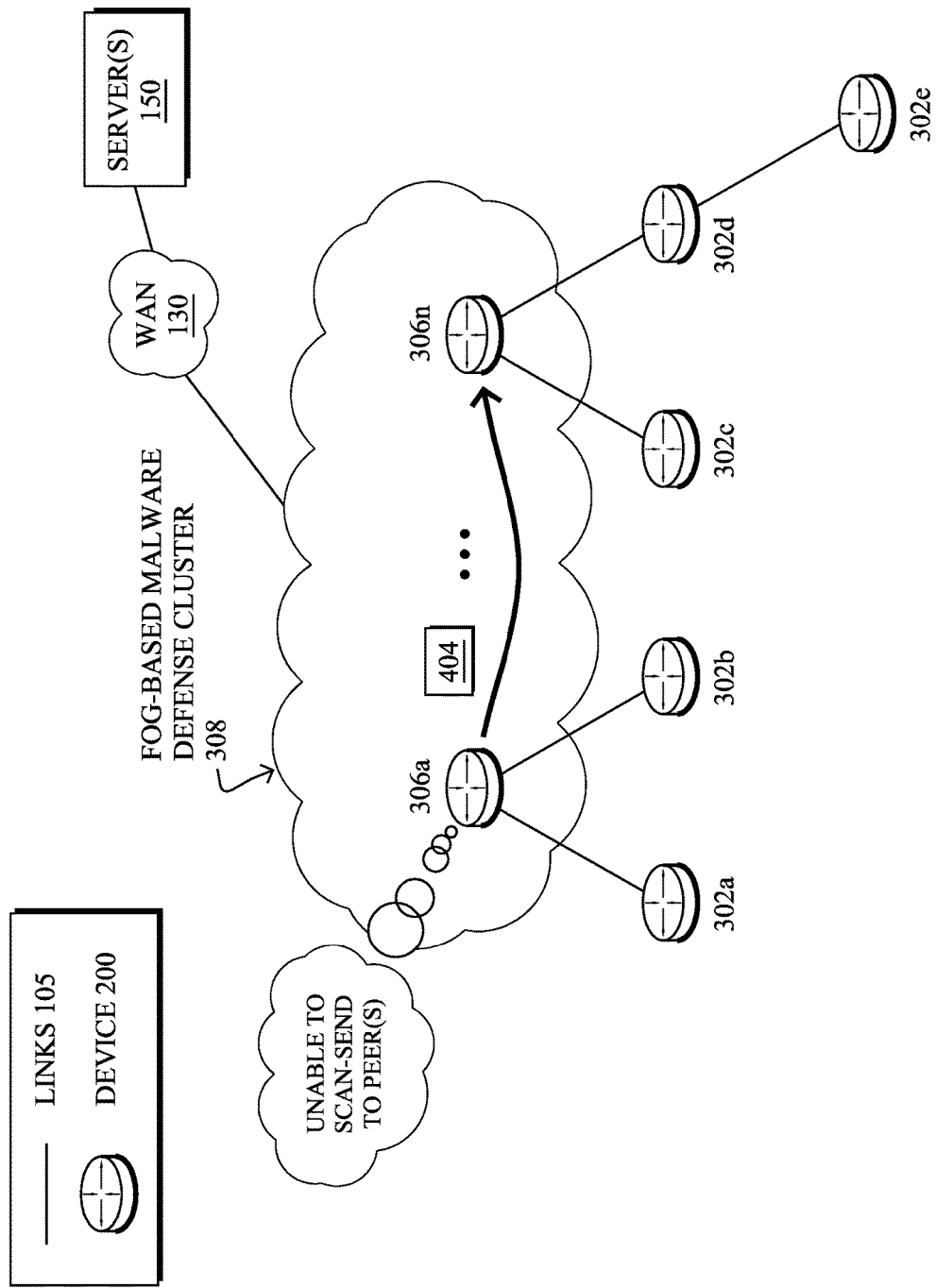

In FIG. 4D, if edge device 306a determines that it cannot analyze the suspicious file, edge device 306a may seek the assistance of one or more of its peer devices in malware defense cluster 308. For example, edge device 306a may send an assessment request 404 to edge device 306n, to request that edge device 306n assess the suspicious file. Each edge device 306 may be pre-configured with the set of other devices 306 that can provide additional malware defense capabilities. Alternatively, edge device 306a may broadcast request 404 to all of its peer devices 306 in cluster 308 within a given scope, such as within the same fog system or within a given set of fog systems.

In some embodiments, request 404 may include only a short representation of the suspicious file or a short, mathematical representation of the file (e.g., a hash, etc.). Said differently, request 404 may comprise only a selected portion of the entire suspicious file. In further embodiments, request 404 may include additional information regarding what assessments edge device 306a already carried out on the file. For example, request 404 may indicate that edge device 306a already scanned the suspicious file using a malware signature set X.

Figure 4E:
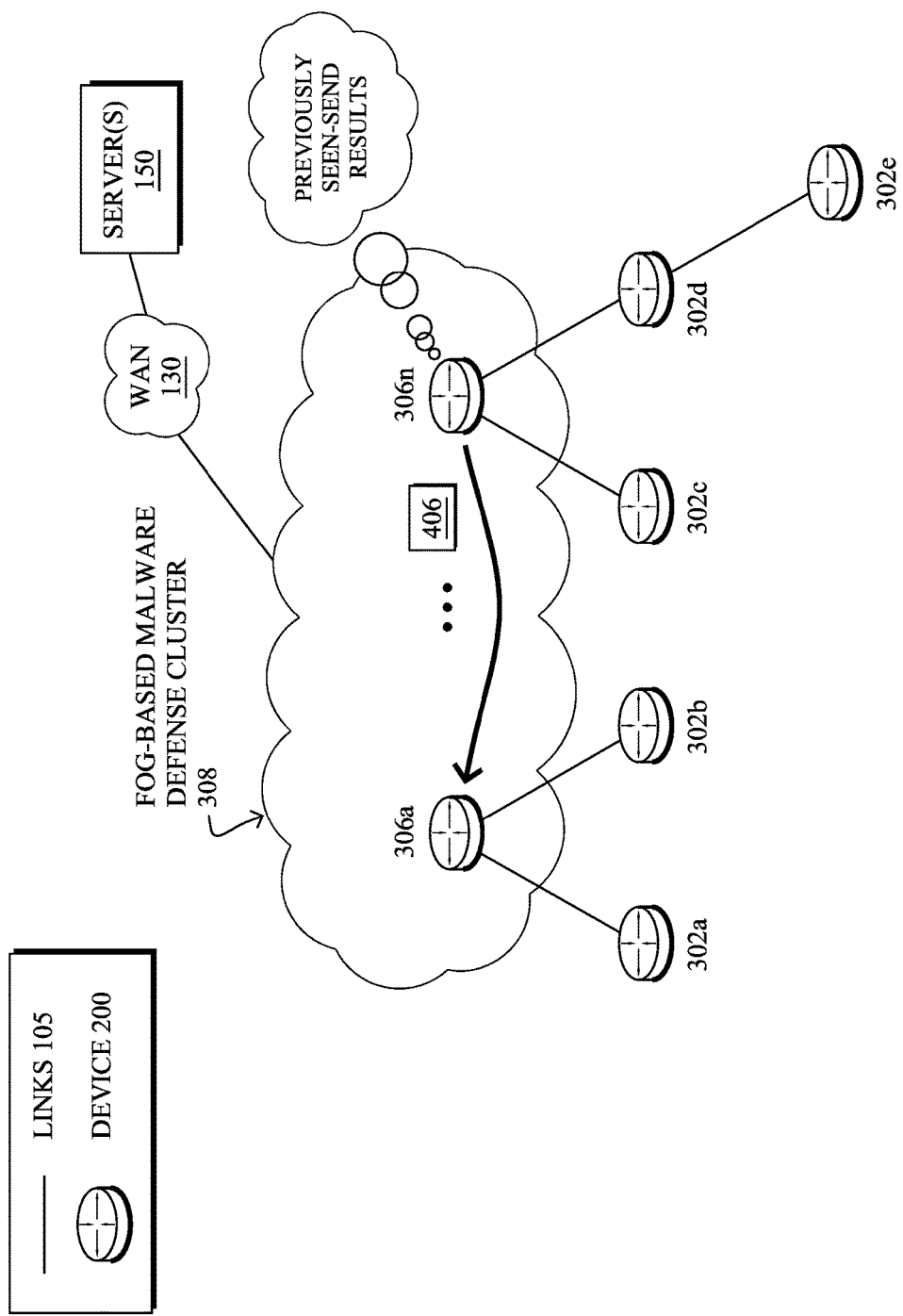

As shown in FIG. 4E, in response to receiving request 404, peer device 306n in malware defense cluster 308 may first determine whether it had previously examined the suspicious file. For example, if request 404 includes only a portion of the suspicious file or a hash of the file, peer device 306n may determine whether peer device 306n already performed a scan of the full file. If peer device 306n has already evaluated the suspicious file, it may return a response 406 to edge device 306a indicating its prior assessment of the suspicious file.

Figure 4F:
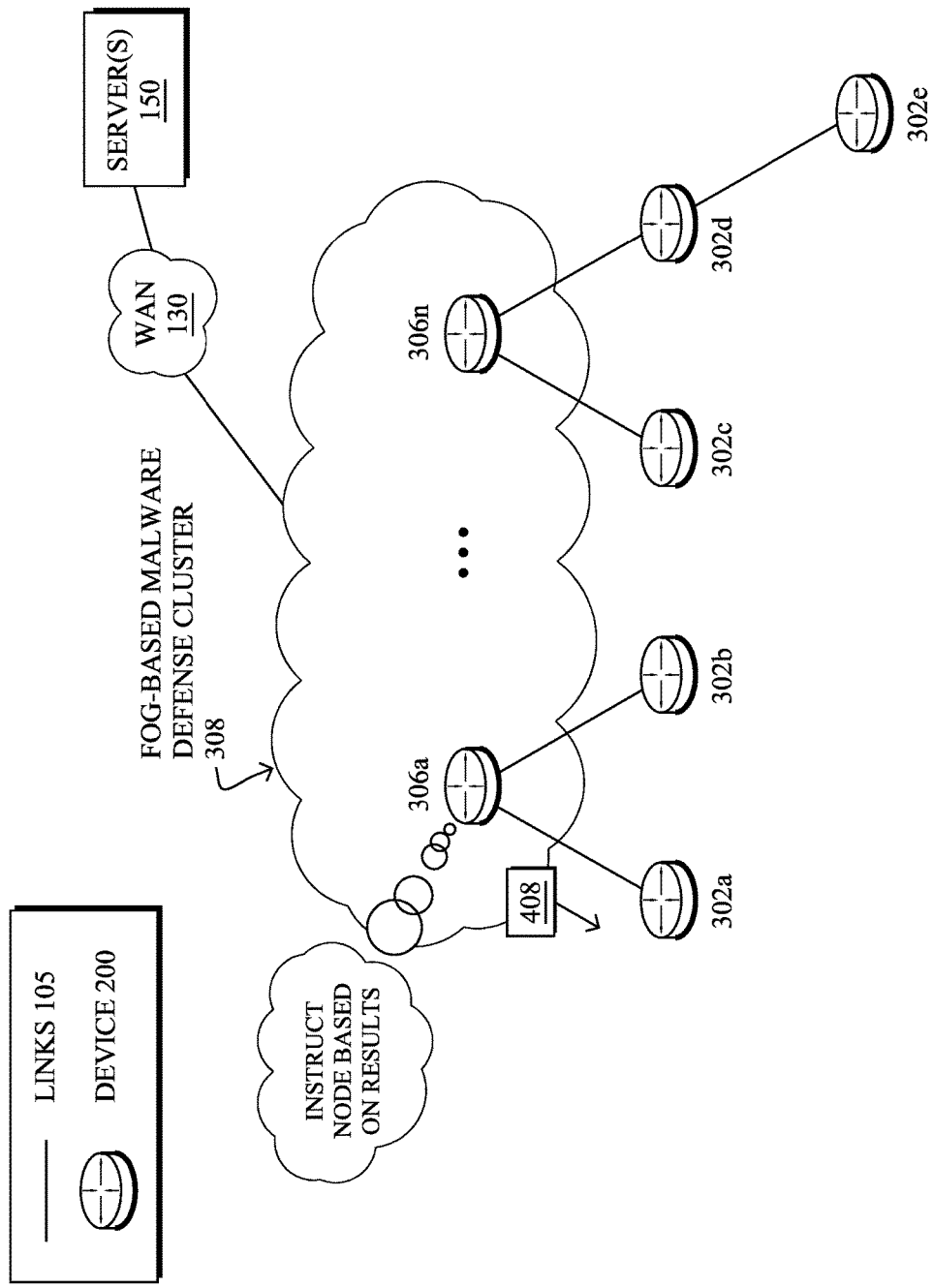

In FIG. 4F, edge device 306a may send an instruction 408 to node 302a based on the assessment of the suspicious file, either by edge device 306a itself or by other peer devices in malware defense cluster 308. For example, instruction 408 may instruct node 302a to delete the suspicious file without further processing, if the file is deemed to include malware. Conversely, instruction 408 may instruct node 302a to install/use the file, if the file is cleared by malware defense cluster 308.

Figure 5A:
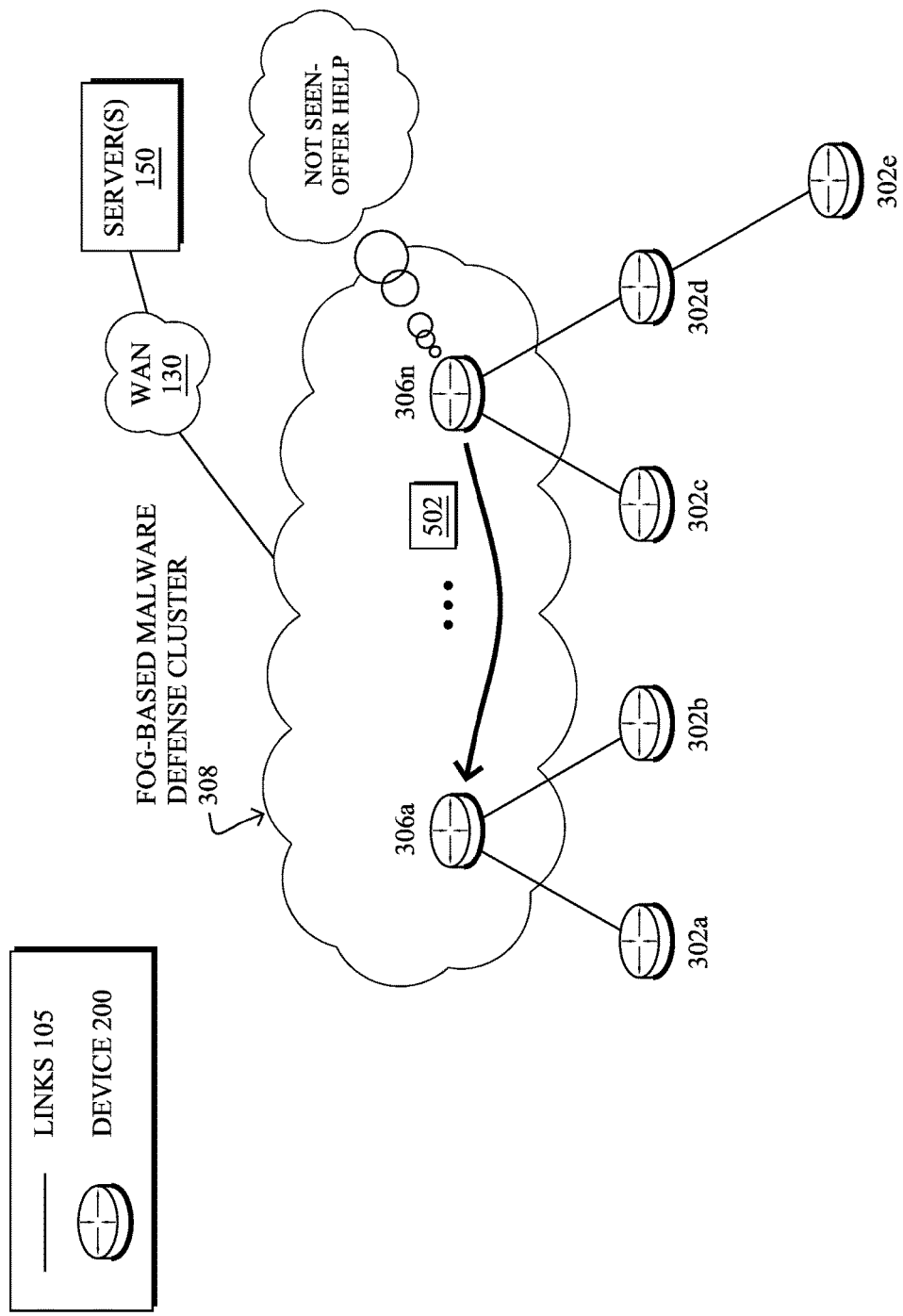
FIGS. 5A-5B illustrate examples of a fog node requesting a full scan of a file.
Figure 5B:
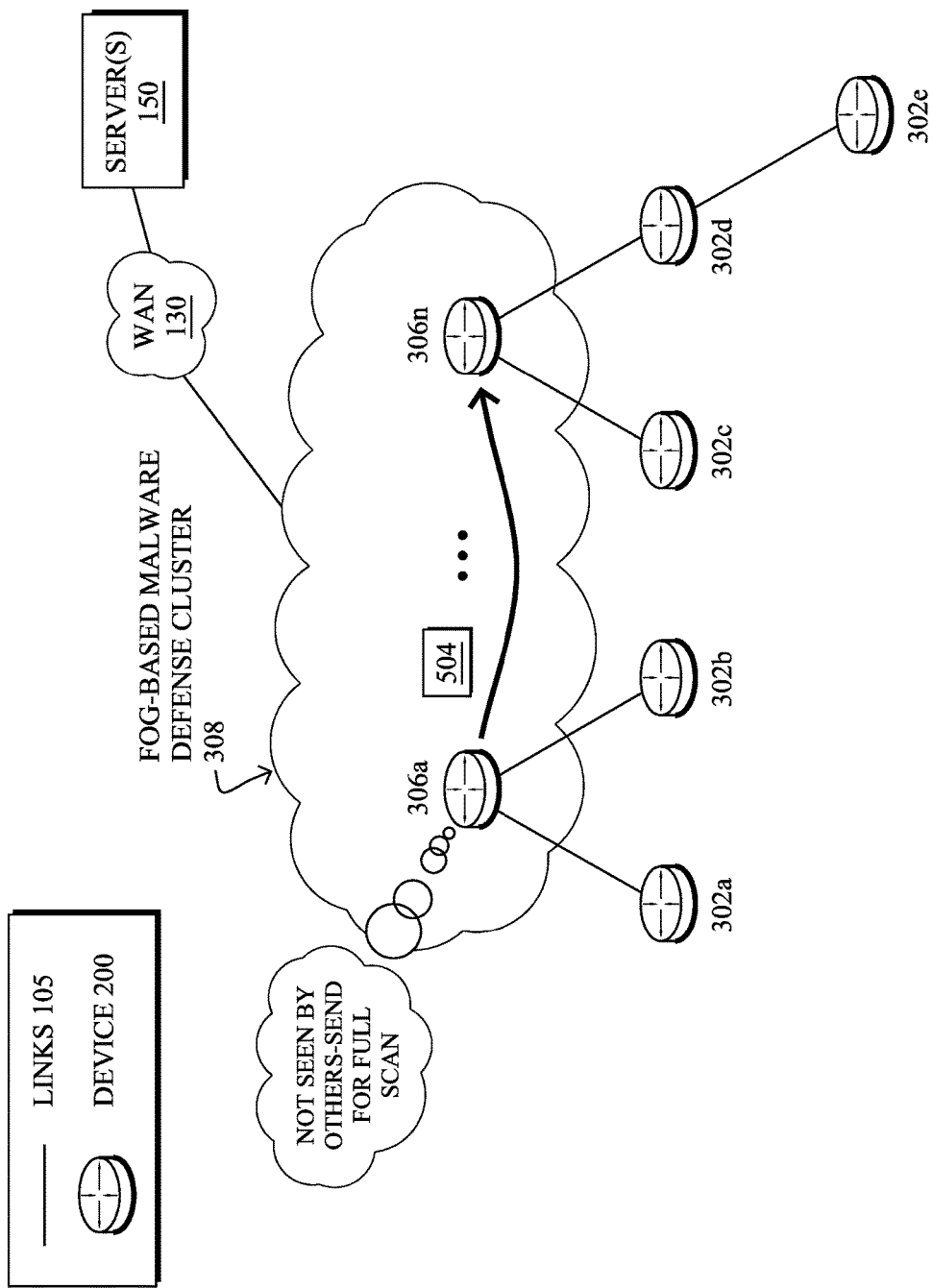

Referring now to FIGS. 5A-5B, examples are illustrated of fog/edge node 306a requesting a full scan of a file, according to various embodiments. Continuing the example of FIGS. 4A-4F, consider the case in which peer device 306n did not perform a prior analysis of the suspicious file. In some embodiments, as shown in FIG. 5A, peer device 506n may determine whether its local scanners can perform a scan of the full file. If so, peer device 306n may provide an offer of help notification 502 back to peer device 306a indicating that peer device 306n is available to perform a deeper analysis of the file.

In FIG. 5B, edge device 306a may process the responses from the peer devices in malware defense cluster 308, to determine whether any of the peer devices have previously assessed the suspicious file. If none of the peer nodes have, edge device 306a may send the full file via message 504 to one or more of the offering peer devices, as shown in FIG. 5B. Notably, in some embodiments, edge device 306a may select a subset of the peer devices 306 in malware defense cluster 308 to perform a scan of the full file, if the suspicious file is new to malware defense cluster 308. Selection of the offering peer devices can be based on a flexible set of criteria, in various embodiments. For example, edge device 306a may base the selection on the capabilities of an offering peer device (e.g., the available resource, malware scanners, etc. of the peer), network metrics such as bandwidth and delays between edge device 306a and an offering peer device, whether the offering peer device is within the same fog system as edge device 306a, or the like.

Referring again to FIG. 4F, some situations may arise in which edge device 306a is still unable to make a final determination regarding the suspicious file, even after seeking the help of other peer nodes in malware defense cluster 308. In such cases, instruction 408 may instruct node 302a to take appropriate measures, such as postponing processing of the file until a final classification of the file is made. For example, in some embodiments, edge device 306a may use cloud-based services (e.g., as provided by servers 150), if malware defense cluster 308 is unable to generate a final classification of the file. Example cloud-based services include Advanced Malware Protection (AMP) Threadgrid services by Cisco Systems, Inc. and the like.

In an alternate embodiment, malware defense cluster 308 can also operate with a broker or dispatcher (e.g., a particular peer device, etc.) that has visibility of the capabilities and relationship of all the malware-defending edge devices 306 and their workloads. In this case, each edge device 306 may instead forward all malware examination requests to this broker to be dispatched. This dispatcher may also consolidate the responses, if the same examination request was dispatched to multiple malware-defending fog devices. The dispatcher can then send back a positive or negative answer and an associated degree of confidence to the requesting fog device, such as device 306*a*.

Figure 6A:
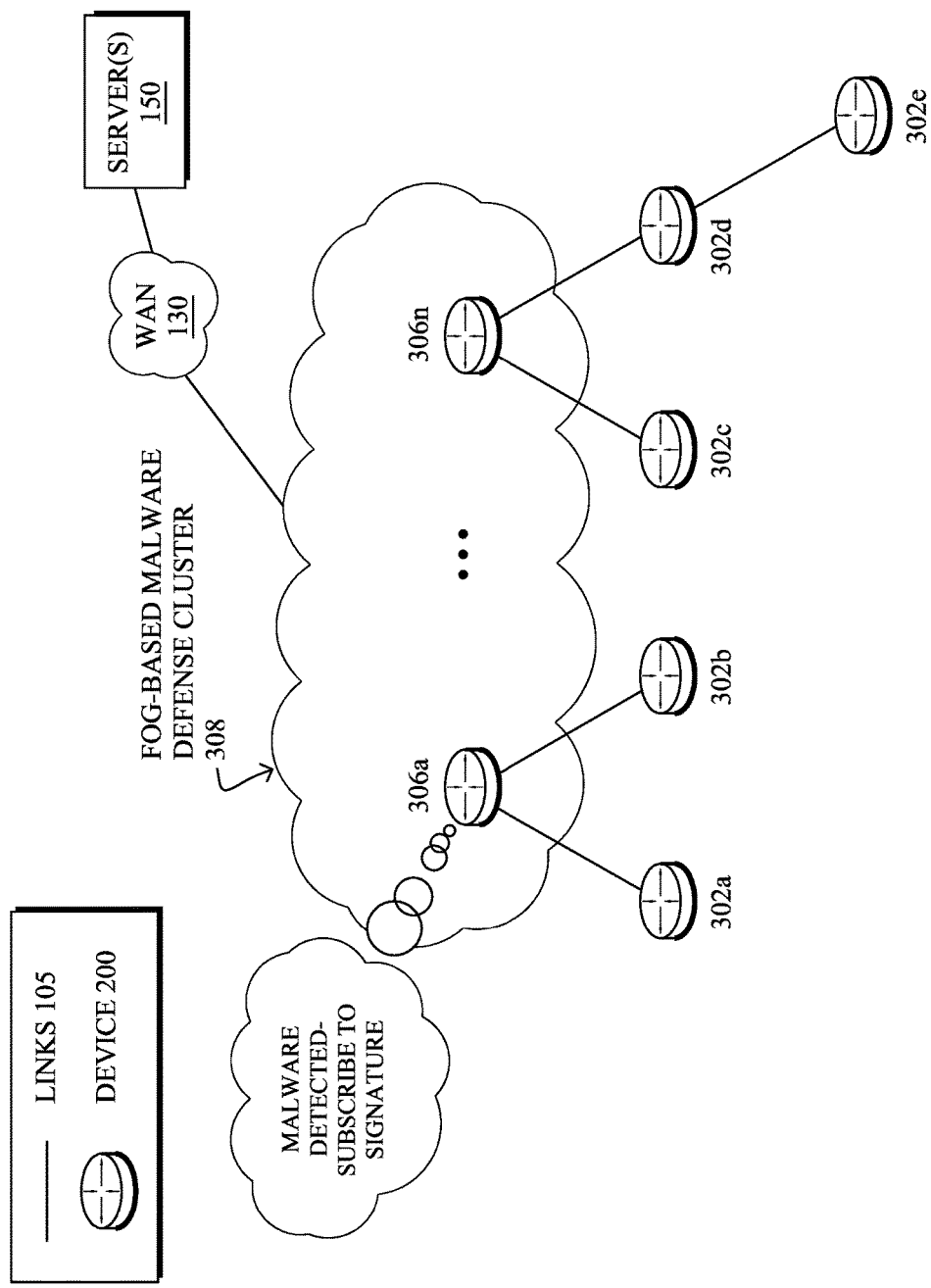
FIGS. 6A-6B illustrate examples of a fog node subscribing to a malware signature bus.
Figure 6B:
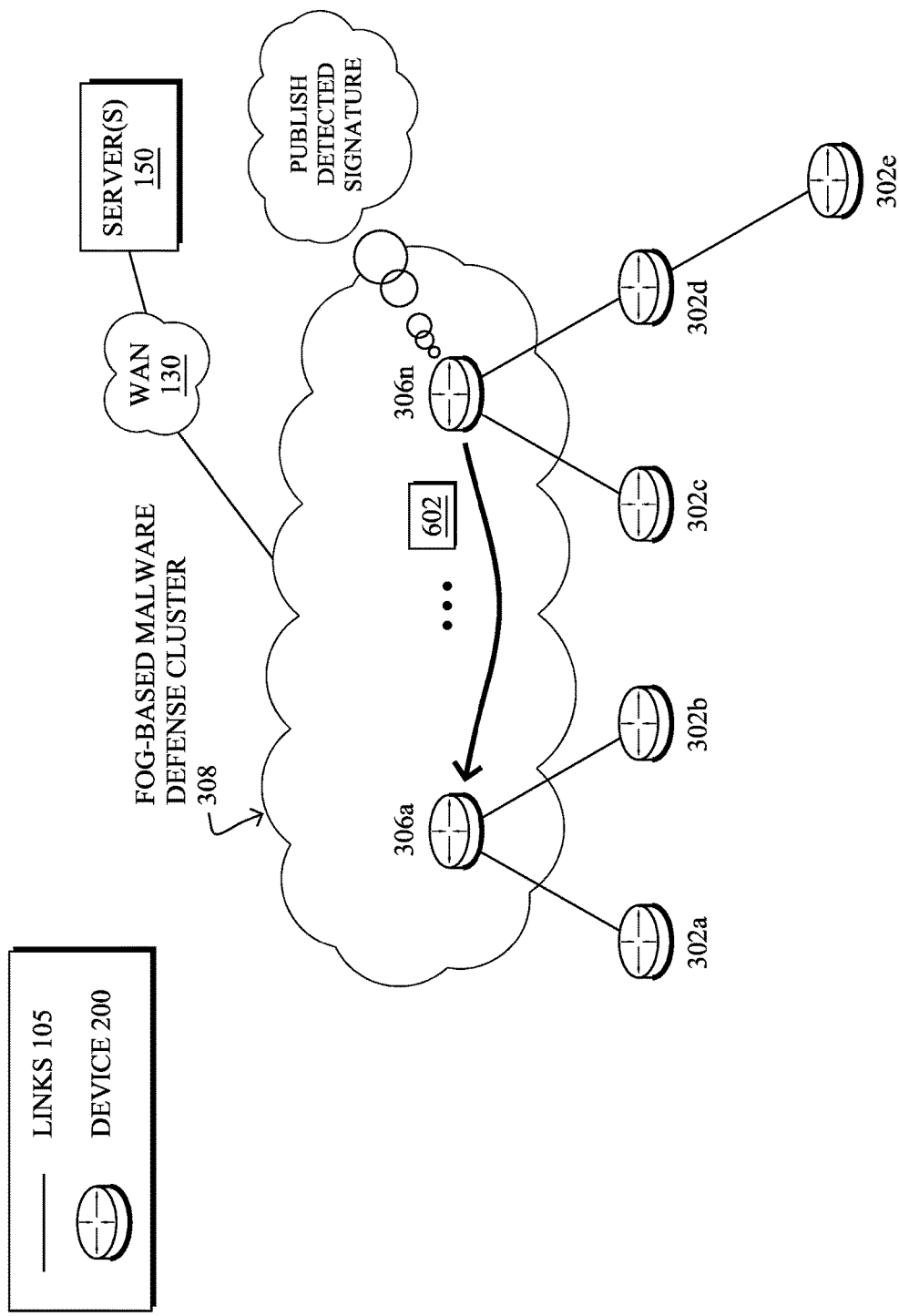

FIGS. 6A-6B illustrate examples of a fog node subscribing to a malware signature bus, according to various embodiments. In some embodiments, the devices 306 in malware defense cluster 308 may implement a publish/subscribe (pubsub) bus. This bus serves to share malware signatures between devices 306 that would be collaborating based on the malware defense mechanisms described herein. For example, as shown in FIG. 6A, assume that edge device 306*a* detects malware with signature XYZ. In accordance with the above mechanisms, edge device 306*a* may handle the malware and subscribe to the corresponding signature for the malware (e.g., XYZ). Edge device 306*a* may also publish the signature to the pub-sub bus. In turn, if device 306*n* is subscribed to the particular signature, device 306*n* may publish message 602 to the bus indicating a.) any pertinent information that device 306*n* may have about the malware and b.) that device 306*n* can help device 306*a* address the malware in a more optimized fashion.

Figure 7:
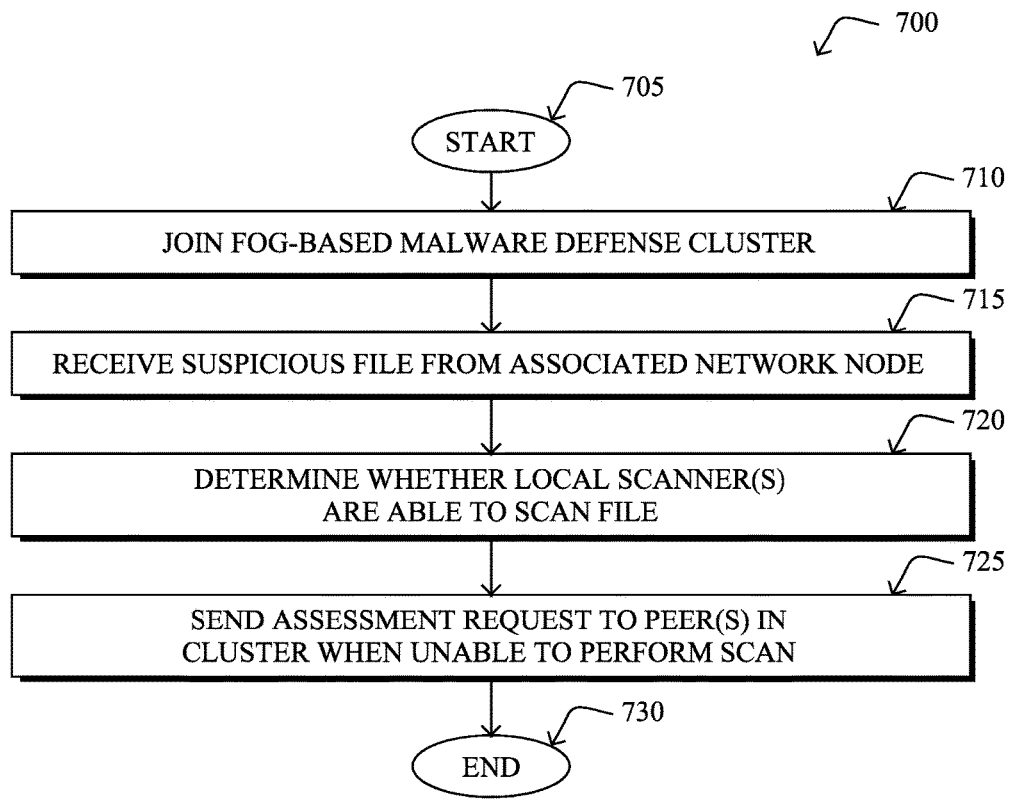
FIG. 7 illustrates an example simplified procedure for participating in a fog-based malware detection cluster.

FIG. 7 illustrates an example simplified procedure for dynamically enabling routing devices in a shared-media communication network, in accordance with one or more embodiments described herein. The procedure 700 may start at step 705, and continues to step 710, where, as described in greater detail above, a device in a network (e.g., an edge/fog/root device, etc.) may join a fog-based malware defense cluster. In some embodiments, the device and each peer device in the cluster may be configured to execute a different set of local malware scanners. For example, malware scanners may be installed to the device, to scan files associated with a particular operating system, etc. The distribution of the different scanners may be based on any number of different characteristics of the devices in the cluster and/or the endpoint nodes to which the cluster provides malware defense. For example, the distribution of scanners may be based on an operating system used by a majority of the nodes associated with the device, a signed version of a data file used by a majority of the nodes associated with the device, or a criticality of traffic associated with a majority of the nodes associated with the device.

At step 715, as detailed above, the device may receive a file flagged as suspicious by a network node associated with the device. Generally, nodes in the network may execute a lightweight agent that does not perform malware scans, but simply identifies new files as suspicious. For example, a node associated with the device may flag a new file as suspicious based on a hash of the file, a size of the file, whether the file was signed, etc. In some cases, the association between the device and the network node may be preconfigured. For example, the network node may be registered to the same local network supported by the device. In other cases, the association between the device and the network node may be established dynamically.

At step 720, the device may determine whether its local malware scanners are able to scan/evaluate the suspicious file, as described in greater detail above. Notably, as the devices in the malware defense cluster may have different defense capabilities, it may be that the device is not configured to assess the file or does not have sufficient resources available to do so.

At step 725, as detailed above, the device may send an assessment request to one or more of its peer device in the malware defense cluster, in response to determining that the local malware scanners of the device are unable to scan the file. For example, if the local scanners of the device are configured to scan files for a first operating system and the suspicious file is related to a second operating system, the device may send an assessment request to one or more of its peers in the malware defense cluster. In some embodiments, the device may include only a selected portion of the suspicious file in the request and/or a hash of the file. In another embodiment, the device may send the assessment request to a peer that is designated as a broker, which then forwards the request on to the appropriate devices in the cluster. Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide a fog-based malware defense architecture that complements traditional approaches and is well suited for applications, such as the IoT. Notably, the architecture provides for the use of a fog-based malware defense cluster that is local, flexible, and has lower latency and higher robustness than other approaches, while not requiring endpoint nodes to execute resource intensive scanners. Further, the techniques herein allow for load balancing, redundancy, and a high availability of features within the malware defense cluster.

While there have been shown and described illustrative embodiments that provide for a fog-based malware defense solution, it is to be understood that various other adaptations and modifications may be made within the spirit and scope of the embodiments herein. In particular, malware defense is just one example of the type of distributed security applications that can run on fog computing devices. In other embodiments, for example, the techniques herein can be adapted to implement fog-based virtual firewalls in which multiple fog devices collaborate to provide advanced firewall functions (e.g., as opposed to concentrating firewall functions on one physical device). These distributed security applications can collaborate with each other as well. For example, the virtual firewalls can use the malware analysis results (e.g., a malicious C2 server, IP address, signature, etc.) to enforce new access control list (ACL) rules.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
joining, by a device in a network, a fog-based malware defense cluster comprising one or more peer devices, wherein the device and each peer device in the cluster are configured to execute a different set of local malware scanners;
installing, by the device, the local malware scanners of the device, wherein the local malware scanners of the device are selected based in part on one or more characteristics of nodes associated with device;
receiving, at the device, a file flagged as suspicious by a node in the network associated with the device;
determining, by the device, whether the local malware scanners of the device are able to scan the file; and
sending, by the device, an assessment request to one or more of the peer devices in the malware defense cluster, in response to determining that the local malware scanners of the device are unable to scan the file.

2. The method as in claim 1, wherein the one or more characteristics of the nodes associated with the device comprise at least one of: an operating system used by a majority of the nodes associated with the device, a signed version of a data file used by a majority of the nodes associated with the device, or a criticality of traffic associated with a majority of the nodes associated with the device.

3. The method as in claim 2, wherein the device is a border router in a local network and the nodes associated with the device are in the local network of the border router.

4. The method as in claim 1, wherein sending the assessment request to the one or more peer devices in the malware defense cluster comprises:
sending, by the device, the assessment request to a peer device in the cluster designated as a broker for forwarding in the cluster, wherein the broker forwards the assessment request to a particular peer device based on the particular peer device hosting a local malware scanner being able to scan the file.

5. The method as in claim 1, wherein sending the assessment request to the one or more peer devices in the malware defense cluster comprises:
sending, by the device, a selected portion of the file for scanning by the one or more peer devices.

6. The method as in claim 1, further comprising:
receiving, at the device, a portion of a second file from a particular peer device in the malware defense cluster; and
sending, by the device, an indication to the particular peer device as to whether the device previously scanned the second file based on the received portion of the second file.

7. The method as in claim 6, wherein the indication indicates that the device had previously scanned the second file and includes a determination as to whether the device flagged the second file as malware.

8. The method as in claim 6, further comprising:
receiving, at the device, the second file for scanning by the local malware scanners of the device, in response to the indication indicating that the device had not previously scanned the second file.

9. The method as in claim 1, further comprising:
subscribing, by the device, to a bus between the peer devices in the malware defense cluster, wherein malware signatures are published to the bus in response to detection by the one or more peer devices on the bus.

10. The method as in claim 1, further comprising:
generating, by the device, a determination as to whether the file is malware; and
sending, by the device, an instruction to the node associated with the device based on the determination as to whether the file is malware.

11. An apparatus, comprising:
one or more network interfaces to communicate with a network;
a processor coupled to the network interfaces and configured to execute one or more processes; and
a memory configured to store a process executable by the processor, the process when executed operable to:
join a fog-based malware defense cluster comprising one or more peer devices, wherein the apparatus and each peer device in the cluster are configured to execute a different set of local malware scanners;
install the local malware scanners of the device, wherein the local malware scanners of the device are selected based in part on one or more characteristics of nodes associated with device;
receive a file flagged as suspicious by a node in the network associated with the apparatus;
determine whether the local malware scanners of the apparatus are able to scan the file; and
send an assessment request to one or more of the peer devices in the malware defense cluster, in response to determining that the local malware scanners of the apparatus are unable to scan the file.

12. The apparatus as in claim 11, wherein the apparatus is a border router of a local network and the node associated with the apparatus is a member of a plurality of nodes in the local network.

13. The apparatus as in claim 12, wherein the apparatus and each peer device execute different sets of malware scanners selected from the group comprising one or more of: a whitelist-based scanner, a blacklist-based scanner, a scanner that segments malware signatures using a distributed database, or a scanner that uses heuristic detection.

14. The apparatus as in claim 11, wherein the process when executed is further operable to:
receive a portion of a second file from a particular peer device in the malware defense cluster; and
send an indication to the particular peer device as to whether the apparatus previously scanned the second file based on the received portion of the second file.

15. The apparatus as in claim 11, wherein the apparatus sends the assessment request to the one or more peer devices in the malware defense cluster by sending a selected portion of the file for scanning by the one or more peer devices.

16. The apparatus as in claim 11, wherein the apparatus is configured to subscribe to a bus between the peer devices in the malware defense cluster, wherein malware signatures are published to the bus in response to detection by the one or more peer devices on the bus.

17. The apparatus as in claim 11, wherein the process when executed is further operable to:
generate a determination as to whether the file is malware; and
send an instruction to the node associated with the apparatus based on the determination as to whether the file is malware.

18. A tangible, non-transitory, computer-readable media having software encoded thereon, the software when executed by a processor of a device in a network operable to:
- join a fog-based malware defense cluster comprising one or more peer devices, wherein the device and each peer device in the cluster are configured to execute a different set of local malware scanners;
- install the local malware scanners of the device, wherein the local malware scanners of the device are selected based in part on one or more characteristics of nodes associated with device;
- receive a file flagged as suspicious by a node in the network associated with the device;
- determine whether the local malware scanners of the device are able to scan the file; and
- send an assessment request to one or more of the peer devices in the malware defense cluster, in response to determining that the local malware scanners of the apparatus are unable to scan the file.

19. The tangible, non-transitory, computer-readable media as in claim 18, wherein the one or more characteristics of the nodes associated with the device comprise at least one of: an operating system used by a majority of the nodes associated with the device, a signed version of a data file used by a majority of the nodes associated with the device, or a criticality of traffic associated with a majority of the nodes associated with the device.

20. The tangible, non-transitory, computer-readable media as in claim 18, wherein the software when executed is further operable to:
- receive a portion of a second file from a particular peer device in the malware defense cluster; and
- send an indication to the particular peer device as to whether the apparatus previously scanned the second file based on the received portion of the second file.

* * * * *